Dec. 24, 1968   J. H. VANDERBILT   3,417,637
MANUAL OVERRIDE UNIT FOR AUTOMATIC VALVES
Filed July 29, 1966   3 Sheets-Sheet 1

INVENTOR
JOHN H. VANDERBILT

BY *Finnegan & Henderson*

ATTORNEYS

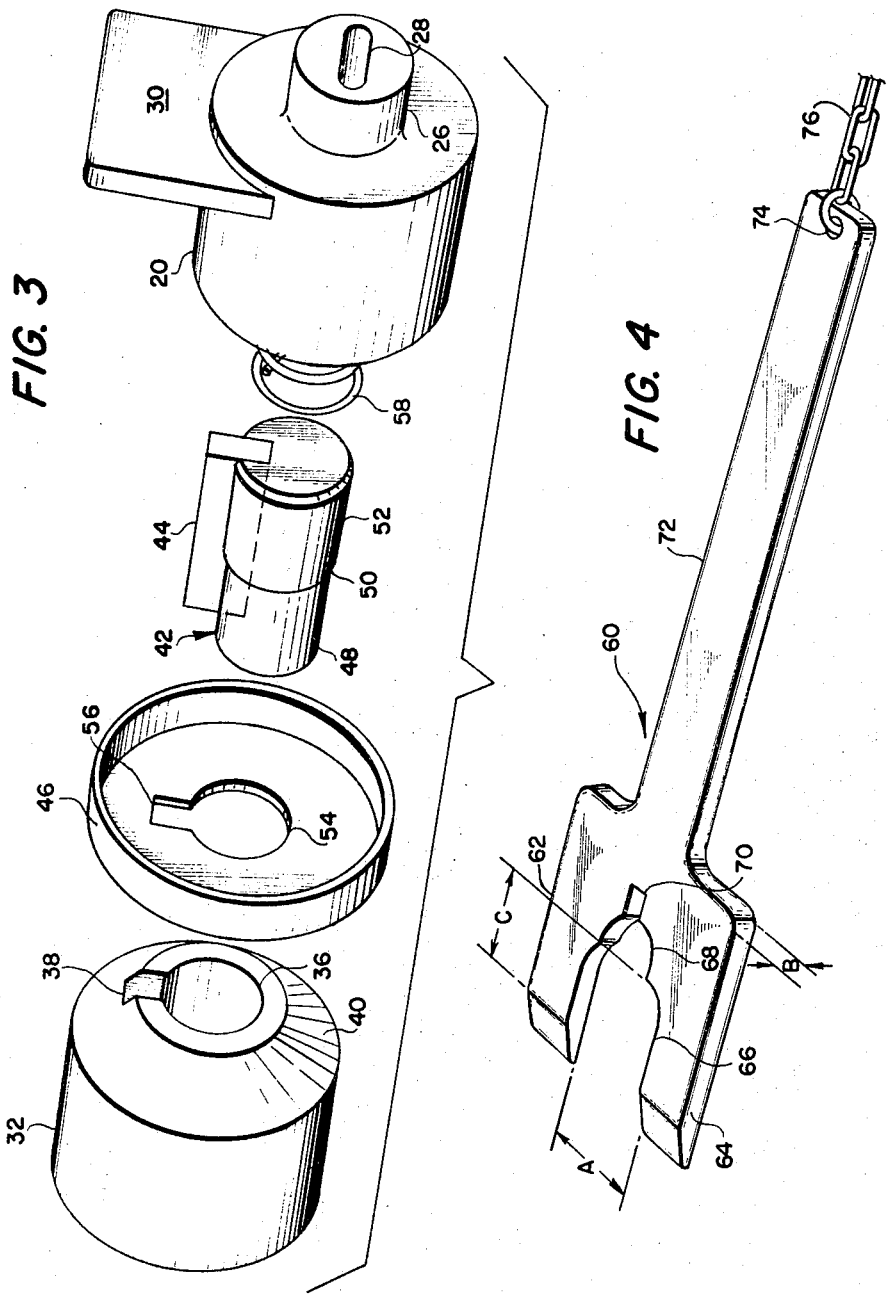

Dec. 24, 1968  J. H. VANDERBILT  3,417,637
MANUAL OVERRIDE UNIT FOR AUTOMATIC VALVES
Filed July 29, 1966  3 Sheets-Sheet 3

INVENTOR
JOHN H. VANDERBILT

BY *Finnegan & Henderson*

ATTORNEYS

United States Patent Office 3,417,637
Patented Dec. 24, 1968

3,417,637
MANUAL OVERRIDE UNIT FOR
AUTOMATIC VALVES
John H. Vanderbilt, Windsor, Conn., assignor to United
Aircraft Corporation, East Hartford, Conn., a corporation of Delaware
Filed July 29, 1966, Ser. No. 568,819
20 Claims. (Cl. 74—625)

ABSTRACT OF THE DISCLOSURE

A manual override unit is provided for use with automatic valves that have rotatable stems to permit the valves to be safely disengaged from the automatic control and operated manually. The unit includes a first member having means connected to the stem of the valve to rotate the stem when the first member is rotated, a second member, means connected to the second member to rotate the second member when the automatic control is actuated, connecting means connecting the first and second members to transmit rotary motion from the second member to the first member with the connecting means being slidably engageable with the second member, and a manual override lever including disengaging means for contacting the second member and wedging the connecting means and the second member out of engagement and engaging means for engaging the connecting means when the connecting means is disengaged from the second member to permit the manual override member to be used manually to rotate the connecting means and hence to rotate the first member and the valve stem.

---

This invention relates to override units for automatic valves and, more particularly, to manual override units for automatic valves which disengage the automatic control system from the valve when the manual control is engaged with the valve.

Throughout this specification, the term "engage" will be used to describe the condition in which two or more members are connected so that one of the members can be rotated responsive to rotation of the other member, and the term "disengage" will be used to described the condition in which rotation of one or more members will not cause rotation of, or otherwise affect, another member.

It is frequently necessary to operate a valve of the shaft-driven type automatically. A typical valve of this type is a quarter-turn ball or plug type valve in which a stem extending from the valve must be rotated 90° to open or close the valve. The automatic operating mechanism is usually attached directly to the valve stem. In such installations, a malfunction of the automatic control equipment requires that the valve stem be disassembled from the automatic control equipment to permit the valve to be operated manually. In situations where rapid achievement of manual control may be required, if a malfunction of the automatic control equipment occurs, there is no time to disassemble the valve stem from the automatic metchanism.

Previous attempts to provide manual controls for such automatic valves have required that the automatic control system be out of axial alignment with the valve stem so that the manual control system can be in axial alignment with the valve stem. Such systems have thus required complex gearing arrangements between the automatic control system and the valve stem. In addition to being expensive and providing additional parts for failure or wear, these systems add increased bulk to the valve control unit.

Additionally, many of the prior manual override units provide no means which assure that the automatic control will be disengaged before the manual system is engaged with the valve stem. There is thus risk of possible injury to the operator, if the automatic control should actuate the valve when the operator is attempting to operate the valve manually. Where the prior art systems do provide means for disengaging the automatic control system, these usually include a complex mechanism involving electronic connections, or complicated clutching mechanisms involving multiple clutches or ball-type clutches, which are subject to malfunctions, particularly when the valve is used in a corrosive atmosphere. Further, many of the prior devices require that the operator maintain constant pressure on the manual operating mechanism in order to keep the automatic control system disengaged; thus, the operator is not free to leave a valve which he is operating manually.

Other prior devices require difficult manipulations by the operator such as inserting mandrels into small holes, and the like. Such manipulations make the manual controls difficult to use in situations where the operator must wear a covering similar to a space suit or a lose skin diver's suit for protection from a toxic atmosphere, such as is frequently found in the vicinity of valves used in the control of rocket propellant materials and the like.

It is therefore a primary object of this invention to provide an improved manual override for automatic valves.

Another primary object of this invention is to provide a manual override for automatic valves that is safe in operation and which will insure that the automatic control is disengaged before the manual control is engaged.

A further objective of this invention is to provide a manual override for automatic valves in which the operation of the manual override mechanisms is entirely independent of the automatic control system.

Another object of this invention is to provide an improved manual override system for automatic valves that is easy to operate and use, even for operators wearing clumsy outer garments.

It is a further object of this invention to provide an improved manual override for automatic valves that is simple in operation and that improves the operational reliability of the entire valve system.

It is still another object of this invention to provide an improved manual override for automatic valves in which the valve and both the manual override and the automatic control system occupy a minimum amount of space.

A further object of this invention is to provide an improved manual override for automatic valves that will not injure either the automatic valve control system or the valve.

A still further object of this invention is to provide an improved manual override for automatic valves in which the manual override system can disengage the automatic control system from the valve for indefinite periods of time without requiring the presence of the operator once the automatic control system has been disengaged.

A further object of one embodiment of this invention is to provide an improved manual override for automatic valves which indicates the position of the valve to a remote automatic control location so that the operator will be aware of actual position of the valve when the manual override is in use.

Additional objects and advantages of the invention will be set forth in part in the description which follows, and in part will be obvious from that description or may be learned by the practice of the invention, the objects and advantages being realized and attained by means of the instrumentalities and combinations particularly pointed out in the appended claims.

The invention consists in the novel parts, constructions, arrangements, combinations, and improvements shown and described.

To achieve its objects and in accordance with its purpose, this invention provides means which, as embodied and broadly described, comprise a first member having means connected to the stem of a valve to rotate the valve when the first member is rotated; a second member having means connected to an automatic valve control to rotate the second member when the automatic valve control is actuated; connecting means connecting the first and second members to transmit rotary motion from the second member to the first member; the connecting means being slidably engageable with the second member; a manual override member having disengaging means for acting on the second member and urging the connecting means and the second member out of engagement; the manual override member also having engaging means for engaging the connecting means, when the connecting means is disengaged from the second member, to permit the manual override to be used manually to rotate the connecting member thereby manually rotating the first member and its valve stem.

Preferably, the first and second members have aligned recesses with the connecting means extending into the recesses. It is also preferred that the first and second members have keyways adjacent their recesses and that the connecting means have a key which is in sliding engagement with the keyways. Additionally, it is preferred that the connecting means have a shoulder and that the second member have an abutting surface adjacent the shoulder of the connecting means to be abutted by the manual override member when the manual override member urges the connecting means and the second member out of engagement. This abutting surface is desirably beveled to provide a groove between the shoulder of the connecting means and the second member when the connecting means and the second member are engaged.

The manual override member is preferably a lever which is bifurcated at its forward end to provide two spaced fingers for entering the groove between the abutting surface of the second member and the shoulder of the connecting means to urge the second member and the connecting means out of engagement. It is also preferred that the lever include a keyway between the fingers for engaging the key of the connecting means so that the lever may rotate the connecting means and thereby rotate the first member and the valve stem.

In accordance with the invention, the fingers of the lever are preferably of sufficient depth to urge the second member and the connecting means out of engagement when the fingers are wedged between the second member and the connecting means. It is also desirable that the keyway of the lever be located inwardly from the leading edges of the fingers a distance sufficient to insure that the fingers will disengage the second member and the connecting means, before the keyway of the lever engages the key of the connecting means.

It is to be understood that both the foregoing general description and the following detailed description are exemplary and explanatory but are not restrictive of the invention.

The accompanying drawings, which are incorporated in and constitute a part of this specification, illustrate one embodiment of the invention and, together with the description, serve to explain the principles of the invention.

Of the drawings:

FIG. 3 is an exploded view in perspective of the manual override unit illustrated in FIG. 1;

FIG. 4 is a perspective view of a lever constructed in accordaance with the teachings of this invention to be used to operate the manual override unit;

Figure 1:
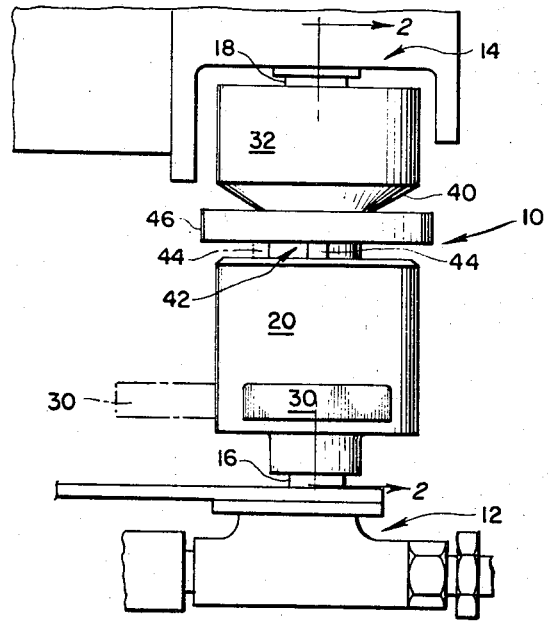
FIG. 1 is a side view of an automatic valve having a manual override unit constructed in accordance with the teachings of this invention.

Referring to FIG. 1, it may be seen that the manual override unit, shown generally as 10, is interposed between the valve, shown generally as 12, and the automatic control system shown in fragmented portion generally as 14. Valve 12 which is here illustrated as a quarter-turn, ball type valve has a stem 16 extending upwardly for control of the valve. Automatic control system 14 has a driving shaft 18 extending downwardly for automatically controlling valve stem 16.

In accordance with the invention, a first member is provided having means connected to the stem of the valve to rotate the stem when the first member is rotated. As here embodied, the first member is body member 20 having an internal recess 22 (best seen in FIGS. 2, 5, and 6) and a keyway 24 adjacent recess 22. Body 20 has a neck 26 with a central slot 28 (best seen in FIGS. 2, 3, 5, and 6) for receiving valve stem 16. Neck 26 may also have a set screw (not shown), or the like, for securely holding valve stem 16 in slot 28.

In accordance with one embodiment of this invention, indicating means are provided on the first member for visibly indicating the actual position of the valve at all times. As here embodied, the indicating means is a flange 30 secured to the outside of body 20 in any conventional manner, as by welding. Flange 30 turns with body 20 and thus always indicates the actual valve position regardless of whether the valve is being operated manually or automatically. If it is desired to have this indication visible at a station remote from the valve itself, directly operated switches (e.g., limit switches) may be provided to be actuated by the flange. The switches may be connected to lights, or the like, at the control station to indicate the true valve position.

In accordance with this invention, a second member is provided having means connected to the automatic valve control to rotate the second member when the automatic valve control is actuated. As here embodied, the second member is a driver member 32 having a square slot 34 in its upper end for receiving driving shaft 18 from automatic control system 14. Driving shaft 18 may be secured in slot 34 by a set screw (not shown) or the like.

Driver member 32 has an internal recess 36 in its lower end (FIGS. 2, 3, 5, and 6) and a keyway 38 adjacent to recess 36. The lower surface 40 of driver member 32 is beveled with the edges tapering gradually away from the center portion of the surface.

In accordance with this invention, connecting means are provided for connecting the first and second members to transmit rotary motion from the second member to the first member. As here embodied, the connecting means comprises a cylindrical plug 42 having a key 44 extending from one side thereof. Key 44 may be attached to plug 42 in any conventional manner. As here embodied, key 44 extends to the bottom edge of the plug but stops short of the top edge of the plug.

In accordance with the invention, the connecting means is slidably engageable with the second member and preferably has a shoulder adjacent the second member. In this embodiment of the invention, the shoulder adjacent the second member is a washer 46 having an annular flange on its lower surface. Washer 46 may be mounted on plug 42 in any conventional manner. As here embodied, plug 42 has an upper section 48 and a lower section 52. Upper section 48 has a smaller diameter than lower section 52 providing a ridge 50 where upper section 48 joins lower section 52. As may be best seen in FIG. 3, washer 46 has a hole 54 in its center with a keyway 56 adjoined thereto. The diameter of hole 54 is larger than the diameter of upper section 48 of plug 42 but smaller than the diameter of lower section 52. As may be seen in FIGS. 2, 5 and 6, when washer 46 is fitted over upper end 48 of plug 42 with key 44 extending into keyway 56, the washer rests on ridge 50.

Figure 2:
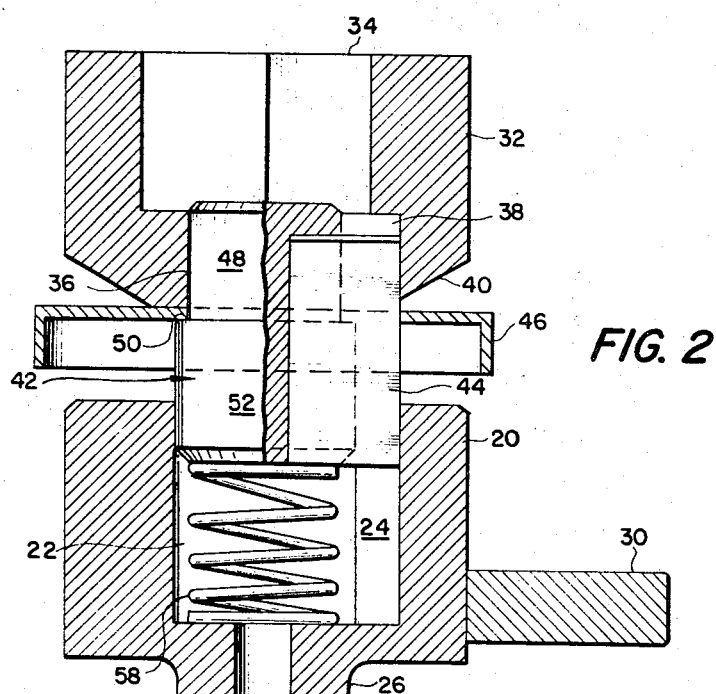
FIG. 2 is a vertical section of the manual override unit of FIG. 1 taken along line 2—2 of FIG. 1.

When the unit is assembled, as shown in FIG. 2, upper section 48 of plug 42 extends into internal recess 36 of driver member 32 with key 44 extending into keyway 38 and lower section 52 of plug 42 extends into internal recess 22 of body member 20 with key 44 extending into keyway 24. Washer 46 is adjacent driver member 32, and the beveled edge 40 of driver member 32, together with the upper surface of washer 46, forms a groove between driver member 32 and washer 46.

In the present preferred embodiment of this invention, resilient means bias the second member and the connecting means into engagement. As here embodied, the resilient means is a compression spring 58 interposed between the base of internal recess 22 of body member 20 and the lower surface of plug 42. As may be best seen in FIG. 2, during automatic operation of the valve compression spring 58 acts to urge plug member 42 upwardly into internal recess 36 of member 32. The upward movement of plug 42 is limited by washer 46 which contacts the lower surface of driver member 32. The upper edge of key 44 extends through washer 46 a sufficient distance to permit key 44 to slide into keyway 38 before the washer limits the upward movement of the plug.

Though it is preferred that the compression spring be located in the base of recess 22, it will be apparent to those skilled in the art that the spring could be eliminated or its location could be varied without departing from the scope of this invention. For example, washer 46 could be rigidly secured to plug 42, and the spring could act between the upper surface of body member 20 and the lower surface of washer 46; or member 32 could be made in two sections biased apart by a spring; or the entire assembly could be inverted and the spring eliminated entirely by relying on the force of gravity to urge plug 42 into recess 36 of member 32.

In accordance with the invention, a manual override member is provided which has disengaging means for acting on the second member and the shoulder of the connecting means for urging the connecting means and the second member out of engagement, and engaging means for engaging the connecting means when the connecting means is disengaged from the second member. As here embodied, the manual override member is a lever, shown generally as 60. Lever 60 is bifurcated at its forward end to provide two fingers 62 and 64 spaced apart by a slot 66. As here embodied, the forward edges of fingers 62 and 64 are beveled.

The width A of slot 66 between fingers 62 and 64 is larger than the diameter of upper section 48 of plug 42. The rearward end of slot 66 has a groove 68 only slightly larger in diameter than the diameter of upper section 48 of plug 42. Groove 68 terminates in a keyway 70 located midway between fingers 62 and 64. As here embodied, fingers 62 and 64 act as the disengaging means while groove 68 and keyway 70 act as the engaging means. The depth B of fingers 62 and 64 is a distance which is greater than the distance that key 44 extends into keyway 38 of member 32, when the unit is in position to be operated automatically, but is less than the distance that upper section 48 of plug 42 extends into recess 36 of driver member 32.

Lever 60 has a handle 72 extending rearwardly of fingers 62 and 64. Handle 72 is provided with a hole 74 for connecting a chain 76 (shown only in part) to the handle to permit lever 60 to be mounted permanently in the vicinity of the remainder of the manual override unit. It is to be understood that chain 76 is of sufficient length to permit the operator complete freedom to use lever 60 to manually operate the valve.

FIGS. 1 and 2 illustrate the operation of the manual override unit when the valve is being controlled automatically. When driving shaft 18 of automatic control system 14 rotates, it causes driver member 32 to rotate. Since plug 42 is connected to driver member 32 by key 44 extending into keyway 38, plug 42 will be rotated when driver member 32 is rotated. Since plug 42 is also engaged with body 20 through key 44 and keyway 24, body 20 also rotates when plug 42 rotates. Valve stem 16 of valve 12 is engaged with slot 28 of body 20 and hence rotation of body 20 rotates valve stem 16.

The valve illustrated is of a type which is operated by a quarter-turn of its stem; thus, when it is desired to automatically actuate valve 12, automatic control system 14 causes driving shaft 16 to rotate 90°. This rotation of driving shaft 18 is accompanied by a similar rotation of driver member 32, plug 42, body 20 and valve stem 16. This 90° rotated position of the override unit is illustrated in FIG. 1 in phantom lines and may be observed by referring to the two positions of flange 30 and key 44.

Figure 5:
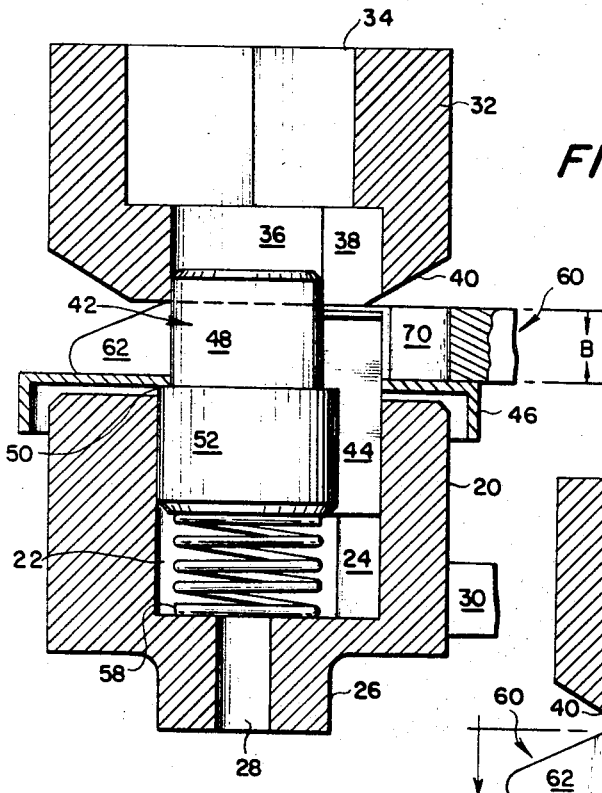
FIG. 5 is a side view partially in section of the manual override unit of FIG. 1 with the lever of FIG. 4 in position to disengage the valve from the automatic control system.
Figure 6:
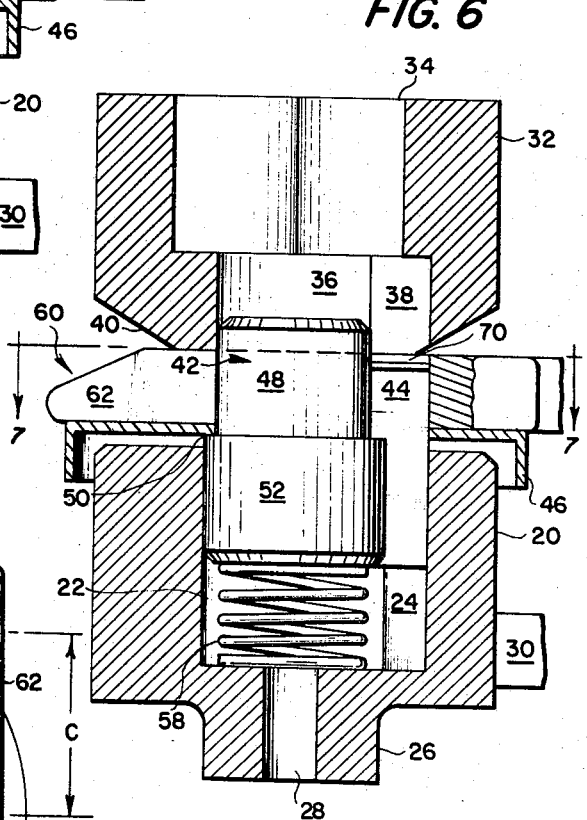
FIG. 6 is similar to FIG. 5 except that it shows the lever in position to permit an operator to manually operate the valve.
Figure 7:
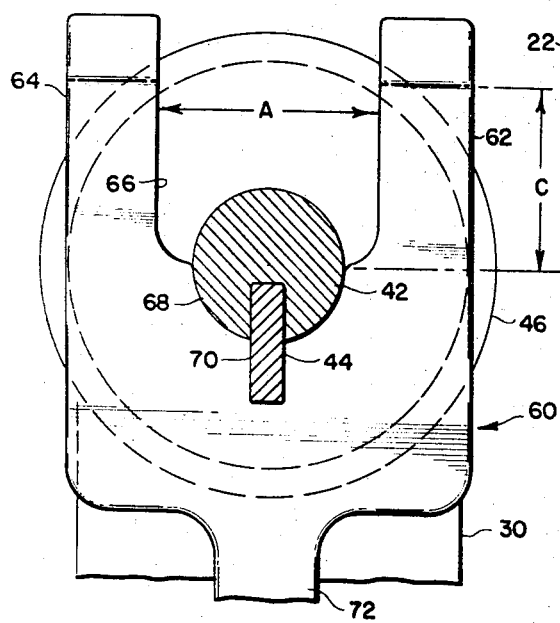
FIG. 7 is a horizontal section of the device in FIG. 6 taken along line 7—7 of FIG. 6.

FIGS. 5 through 7 illustrate the operation of lever 60 to disengage automatic control system 14 from the operation of valve 12 and to engage plug 42 for manual operation of the valve. To disengage the automatic control system 14, the leading edges of fingers 62 and 64 of lever 60 are inserted in the groove formed between beveled edge 40 of body member 32 and the upper surface of washer 46. The beveled leading edges of fingers 62 and 64 assist in starting fingers 62 and 64 into the groove.

With the upper surfaces of fingers 62 and 64 abutting the undersurface of body member 32, and with the undersurface of fingers 62 and 64 abutting the upper surface of washer 46, lever 60 is urged inwardly toward plug 42. The inward movement of lever 60 wedges body member 32 and plug 42 apart by urging plug 42 downwardly against the bias of compression spring 58.

As shown in FIG. 5, once the full depth B of fingers 62 and 64 is between the lowermost surface of body member 32 and the upper surface of washer 46, key 44 of plug 42 will be out of engagement with keyway 38 of body 32. Since the length C of fingers 62 and 64 between the end of the beveled edges and the beginning of groove 68 is sufficient to insure that groove 68 and keyway 70 cannot be engaged by key 44 until after the full width B of fingers 62 and 64 have been inserted between member 32 and washer 46, and since the space A between fingers 62 and 64 is greater than the diameter of upper section 48 of plug 42 combined with the distance that key 44 extends radially from upper section 48, plug 42 will be free to rotate in slot 66 without engaging any portion of lever 60 and the actuation of automatic control system 14 at a time when lever 60 is being inserted but prior to the disengagement of body member 32 from plug 42 will not harm the operator. Once lever 60 has reached the position illustrated in FIG. 5 with key 44 disengaged from keyway 38, the actuation of the automatic control will affect only body member 32 and not the other elements of the automatic control unit.

As lever 60 is urged further forward to the position illustrated in FIG. 6, keyway 70 of lever 60 engages key 44. Lever 60 is now in position to manually operate valve 12. To operate the valve manually the operator simply rotates lever 60, 90°. Since lever 60 is engaged with plug 42 through key 44 and keyway 70, and since body 20 is also engaged with plug 42 through key 44 and keyway 24, the 90° rotation of lever 60 also rotates plug 42, body 20, and valve stem 16, 90°.

Once lever 60 is in position between driver member 32 and washer 46, no additional effort is required by the operator to keep the automatic control system disengaged. Thus, the operator may simply leave lever 60 in position and need not remain in the vicinity of the valve during the time that he desires to have the automatic control system disengaged.

When it is desired to return the control of the valve to the automatic control system, the operator simply withdraws lever 60 from between driver member 32 and washer 46. With lever 60 withdrawn, the bias of compression spring 58 urges upper section 48 of plug 42 upwardly into recess 36 of driver member 32 and key 44 upwardly into keyway 38. Since the depth B of fingers 62 and 64 is not sufficient to urge upper extension 48 entirely out of recess 36, driver member 32 and plug 42 are held in proper axial alignment at all times. If key 44 is not properly aligned with keyway 38, the operator may simply rotate lever 60 sufficiently to bring the key and keyway into alignment before withdrawing the lever from the unit or may operate the automatic control through one cycle to "pick up" the engagement.

In accordance with the invention, a new and improved manual override for automatic valves is provided, the use of which does not harm the automatic control system nor the valve itself and which has the advantages of ease of operation, simplicity, reliability, low cost, and safety.

The invention in its broader aspects is not limited to the specific details shown and described, but departures may be made from such details within the scope of the accompanying claims without departing from the principles of the invention and without sacrificing its chief advantages.

What is claimed is:

1. An improved manual override for valves having rotatable stems which are actuated by automatic controls comprising:
   a first member having means connected to the stem of the valve to rotate the stem when said first member is rotated;
   a second member;
   means connected to said second member and the automatic control to rotate said second member when the automatic control is actuated;
   connecting means connecting said first and said second members to transmit rotary motion from said second member to said first member, said connecting means being slidably engageable with said second member; and
   a manual override lever including disengaging means for contacting said second member and wedging said connecting means and said second member out of engagement, and engaging means for engaging said connecting means when said connecting means is disengaged from said second member to permit said manual override lever to be used manually to rotate said connecting means, thereby manually rotating said first member and the valve stem.

2. The invention of claim 1 wherein said first and second members have aligned recesses and said connecting means extends into the recesses.

3. The invention of claim 2 wherein said first and second members have aligned keyways adjacent their recesses and said connecting means has a key extending into the keyways.

4. The invention of claim 3 wherein resilient means bias said second member and said connecting means into engagement, and said manual override lever overcomes the bias of said resilient means in disengaging said second member and said connecting means.

5. The invention of claim 4 wherein said resilient means is located in the base of the recess in said first member and acts to bias said connecting means outwardly of the recess in said first member and inwardly into the recess of said second member.

6. The invention of claim 3 wherein said connecting means has a shoulder and said second member has an abutting surface adjacent said shoulder of said connecting means, to be abutted by said manual override member when said manual override member urges said connecting means and said second member out of engagement, said abutting surface being beveled to provide a groove between said shoulder and said second member when said connecting means and said second member are engaged.

7. The invention of claim 3 wherein said manual override lever is bifurcated at its forward end to provide two spaced fingers for wedging between said abutting surface of said second member and said shoulder of said connecting means to urge said second member and said connecting means out of engagement.

8. The invention of claim 7 wherein said lever includes a keyway between its fingers for engaging the key of the connecting means to permit said lever to rotate the connecting means and thereby rotate said first member and the valve stem.

9. The invention of claim 8 in which said fingers are of sufficient depth to urge said second member and the connecting means out of engagement when said fingers are wedged between said second member and the connecting means, and in which the keyway of said lever is spaced inwardly from the leading edges of said fingers a distance sufficient to insure that said fingers will have disengaged said second member and said connecting means before the keyway of said lever can engage the key of the connecting means.

10. The invention of claim 9 wherein the leading edge of each of said fingers is beveled to facilitate the inserting of said lever in the groove between said second member and the connecting means.

11. The invention of claim 10 wherein said lever includes a handle extending rearwardly from said fingers.

12. An improved manual override for valves having rotatable stems which are actuated by automatic controls comprising:
   a first member having means engaging the stem of the valve to rotate the stem when said first member is rotated;
   a second member having a beveled surface;
   means connected to said second member and engaging the automatic control to rotate said second member when the automatic control is actuated;
   connecting means engaging said first and said second members to transmit rotary motion from said second member to said first member, said connecting means being slidable into and out of engagement with said second member and having a shoulder adjacent said beveled surface of said second member to provide a groove between said shoulder and said second member when said connecting means and said second member are engaged; and
   a manual override lever having its forward end bifurcated to provide two spaced fingers for entering the groove between said beveled surface of said second member and said shoulder of said connecting means to urge said second member and said connecting means out of engagement, said lever including engaging means for engaging said connecting means to permit said lever to rotate said connecting means and thereby rotate said first member and said valve stem.

13. The invention of claim 12 wherein said first and said second members have aligned recesses and aligned keyways adjacent their recesses and said connecting means has a key and extends into the recesses with its key extending into said keyways.

14. The invention of claim 13 wherein said engaging means of said lever is a keyway between said fingers for engaging said key of said connecting means.

15. The invention of claim 14 wherein resilient means are located in the base of the recess in said first member and acts to bias said connecting means outwardly of said recess in said first member and inwardly into the recess in said second member and said manual override lever overcomes the bias of said resilient means in disengaging said connecting means from said second member.

16. The invention of claim 15 wherein said fingers are of sufficient depth to urge said second member and said connecting means out of engagement when said fingers are wedged between said second member and said connecting means, and wherein the keyway of said lever is spaced inwardly from the leading edges of said fingers a distance sufficient to insure that said fingers will have disengaged said second member and said connecting means before the keyway of said lever can engage said key of said connecting means.

17. The invention of claim 16 wherein the leading edge of each of said fingers is beveled to facilitate the inserting of said lever in the groove between said second member and said connecting means.

18. The invention of claim 17 wherein said lever includes a handle extending rearwardly from its bifurcated end.

19. The invention of claim 12 wherein indicating means are provided on said first member to visibly indicate the position of the valve.

20. The invention of claim 14 wherein said indicating means includes a flange connected to said second member.

References Cited

UNITED STATES PATENTS

| | | | |
|---|---|---|---|
| 1,622,203 | 3/1927 | Napier et al. | 123—90 |
| 402,014 | 4/1889 | Goddu | 192—93 |
| 1,258,310 | 3/1918 | Bratton | 192—89 |
| 1,406,333 | 2/1922 | Beach | 251—130 |
| 1,581,251 | 4/1926 | Troppman | 192—89 |
| 2,189,475 | 2/1940 | Saur | 251—130 |
| 2,693,718 | 11/1954 | Gericke | 74—625 |

FRED C. MATTERN, JR., *Primary Examiner.*

W. S. RATLIFF, *Assistant Examiner.*

U.S. Cl. X.R.

192—93; 251—130, 291